(12) United States Patent
Al-Husseini

(10) Patent No.: US 11,613,365 B1
(45) Date of Patent: Mar. 28, 2023

(54) ELECTROMAGNETIC DEVICE FOR AN EJECTOR-SPRING STATIC LINE RESERVE PARACHUTE

(71) Applicant: Mahdi Al-Husseini, Douglasville, GA (US)

(72) Inventor: Mahdi Al-Husseini, Douglasville, GA (US)

(73) Assignee: United States Army Airborne School, Fort Benning, GA (US)

( * ) Notice: Subject to any disclaimer, the term of this patent is extended or adjusted under 35 U.S.C. 154(b) by 0 days.

(21) Appl. No.: 17/561,200

(22) Filed: Dec. 23, 2021

(51) Int. Cl.
*B64D 17/70* (2006.01)
*B64D 17/60* (2006.01)

(52) U.S. Cl.
CPC ............. *B64D 17/70* (2013.01); *B64D 17/60* (2013.01)

(58) Field of Classification Search
CPC ........ B64D 17/52; B64D 17/54; B64D 17/60; B64D 17/70
See application file for complete search history.

(56) References Cited

U.S. PATENT DOCUMENTS

| 11,027,850 B1* | 6/2021 | Sedillo | B64D 47/02 |
| 2021/0070455 A1* | 3/2021 | Western | B64D 17/725 |

* cited by examiner

*Primary Examiner* — Richard G Davis

(57) ABSTRACT

Disclosed are various embodiments for an electromagnetic automatic deactivation device (ADD). An ADD may be used with an ejector-spring static line reserve parachute, common in low-altitude military jumps. Activating a reserve parachute from within an aircraft, while being towed by an aircraft, or when trapped inside another parachute, can result in significant injury, and may be fatal. An ADD may be added to the internal packaging of a reserve parachute to prevent its accidental activation. An ADD may be configured to sense ambient pressure, linear and rotational motion, and other data, to identify hazardous environmental conditions. An ADD may be further configured to support a towed jumper whose static line is cut, by strategically deactivating the electromagnetic assembly, and therefore activating the reserve parachute. The ADD may be modified to include the ability to override the ADD with a secondary pull on the ripcord handle.

10 Claims, 6 Drawing Sheets

| State | Trigger to entry | Phase | Powered sensors | Powered actuators |
|---|---|---|---|---|
| Idling | Reset push-button pushed OR Below armed altitude floor AND ADD is armed | In aircraft, On ground | Pressure altitude | None |
| Armed | Above armed altitude floor AND ADD is idling | In aircraft, Free-fall | Pressure altitude, 3-axis gyroscope, 3-axis accelerometer, Wire-displacement | Data collection system |
| Activated | ADD is armed AND reserve ripcord handle pulled AND reserve-stop condition met | In aircraft, Jumper in tow, On ground | Pressure altitude, 3-axis gyroscope, 3-axis accelerometer | Data collection system, Electromagnet, Amplifier + Speaker |
| Deactivated | ADD is armed AND reserve ripcord handle pulled AND reserve-stop condition not met OR Free-fall AND ADD is activated | Free-fall, On ground | Pressure altitude | Data collection system, Amplifier + Speaker |

ADD States

FIG. 6

ELECTROMAGNETIC DEVICE FOR AN EJECTOR-SPRING STATIC LINE RESERVE PARACHUTE

BACKGROUND

1. Technical Field

The present invention pertains to the method and design of an electromagnetic automatic deactivation device (ADD) for an ejector-spring static line reserve parachute, such as those typically used in low-altitude military jumps.

2. Background Art

The following is a tabulation of some prior art that presently appears relevant:

| U.S. Patents | | | |
|---|---|---|---|
| Patent Number | Kind Code | Issue Date | Patentee |
| 7,073,752 | B2 | Jul. 22, 2006 | Voronka |
| 6,953,173 | B2 | Oct. 11, 2005 | Lukavec |
| 6,880,786 | B2 | Apr. 19, 2005 | Weis |

Static line reserve parachutes are manually activated by pulling on a ripcord handle connected to a reserve ripcord that compresses an internally contained ejector-spring. As demonstrated by Voronka, Lukavec, and Weis, automatic activation devices (AAD) exist that utilize pyrotechnic cutters to cut the reserve ripcord and force the deployment of the reserve parachute. The industry focus thus far has been on developing AADs. However, there are key moments in a jump where the activation of the reserve parachute can be hazardous—for example, from within the aircraft, in towed jumper situations, and when trapped inside another jumper's main parachute. This is reflected in the training conducted at the United States Army Airborne School, where trainees are regularly reminded to cover their reserve ripcord handle inside the aircraft and instructed not to pull their reserves while in either a towed jumper situation or trapped inside a fellow jumper's parachute. A device designed to automatically deactivate ejector-spring static line reserve parachutes in hazardous environmental conditions does not currently exist.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 6 shows a table describing possible ADD states, triggers, and power configurations.

DETAILED DESCRIPTION

Figure 1:
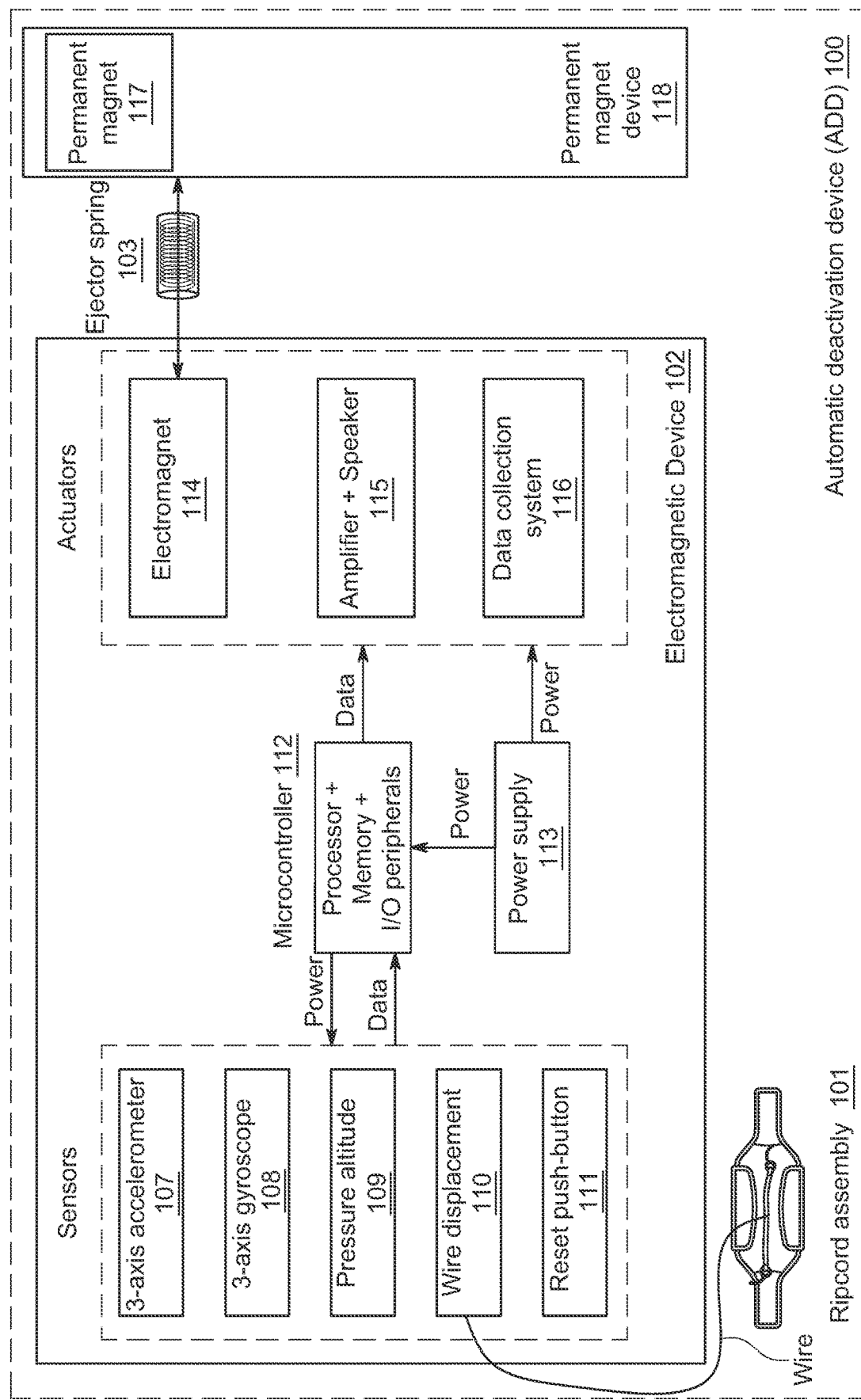
FIG. 1 shows the block diagram of an embodiment of an automatic deactivation device (ADD).
Figure 2:
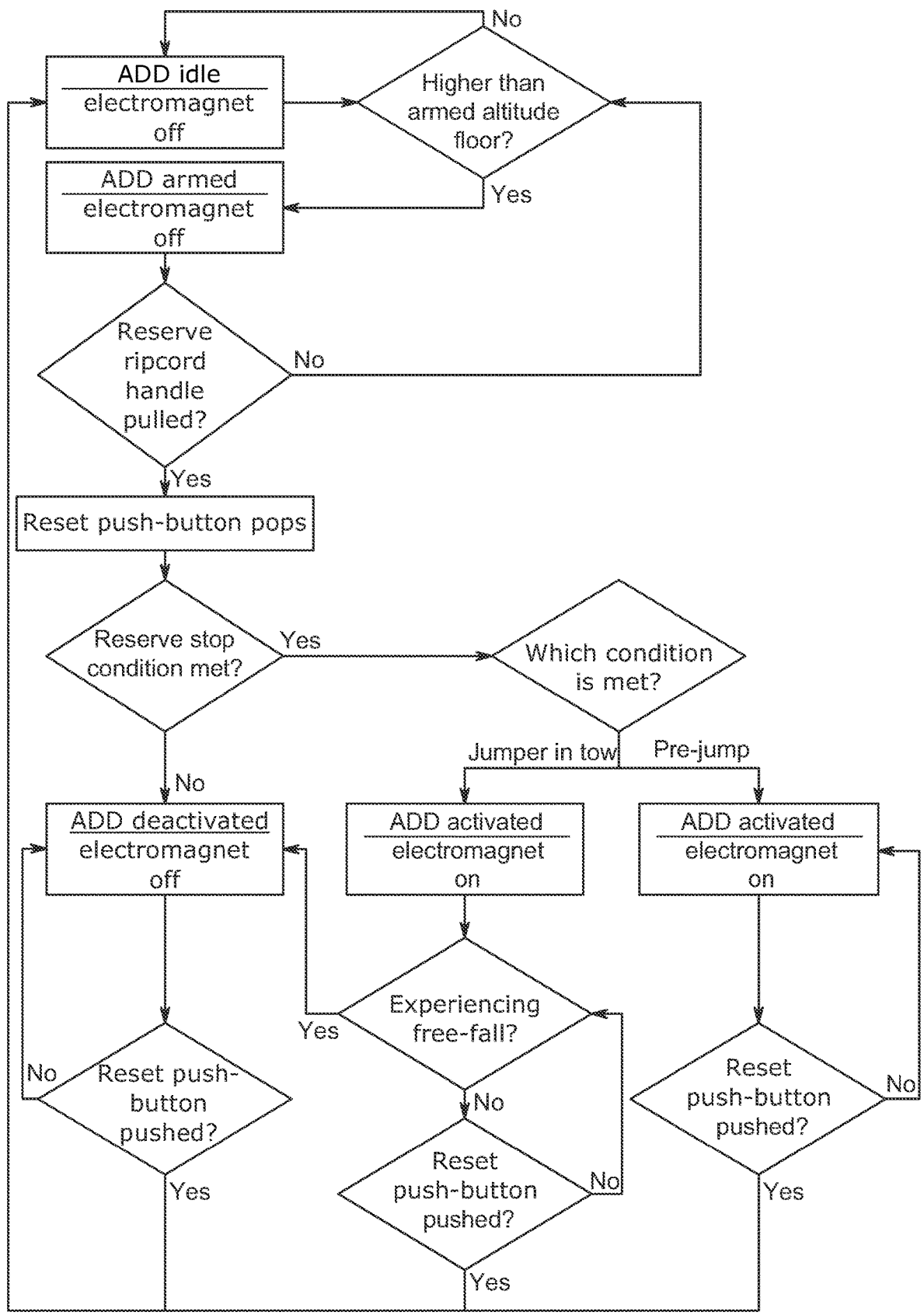
FIG. 2 shows a flowchart detailing an example algorithm employed by an ADD.
Figure 3:
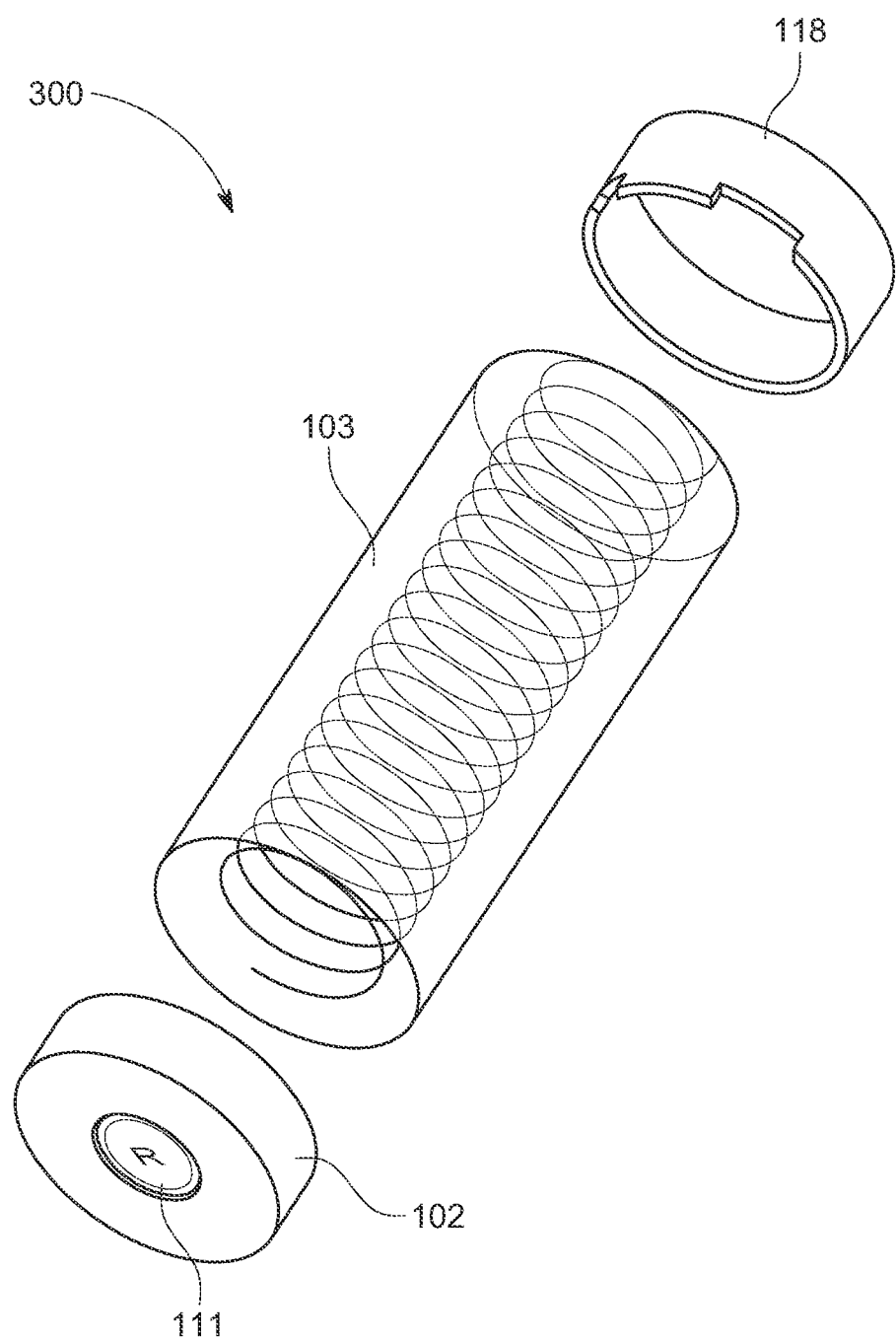
FIG. 3 shows an embodiment of an ADD with an uncompressed ejector-spring placed between magnetic devices.

The present disclosure describes an electromagnetic assembly, hereafter referred to as an automatic deactivation device (ADD), that prevents the hazardous release of a reserve parachute by compressing its internal ejector-spring. The ADD supports existing ejector-spring static line reserve parachute configurations, and does not require actuation by jumpers, only configuration by parachute riggers. The ADD has been designed to supplement, and not supplant, current military static line jumping safety policy and instruction.

The ADD seeks to prevent injury caused by the deployment of a reserve parachute in at least two untimely, but well-defined environmentally hazardous conditions hereafter referred to as reserve-stop conditions: within the aircraft and in towed jumper situations. If a reserve parachute is activated near an open aircraft door prior to exit, the attached jumper—and jumpers between the attached jumper and the open door—are at risk of being pulled out of the aircraft. In a towed jumper situation, the jumper is dragged behind the aircraft by their improperly deployed equipment. Jumpers become towed due to improper exit techniques or equipment complications. A third, possible reserve-stop condition is parachute entanglement. During mass-exit jumps, mid-air jumpers are often within twenty-five feet of one another, or dangerously close. A higher jumper may fall into one of four corner-vents of a lower jumper's parachute canopy; this will cause the higher jumper's parachute to collapse. A jumper who has fallen through another jumper's parachute canopy is advised to prevent the deployment of their reserve, and to prepare to conduct a parachute landing fall.

The ejector-spring inside the reserve parachute is boxed in vented cloth and has fabric covers at both ends. Each fabric cover is connected to two locator tabs with grommet inlays. Pull-up cords are strung through the locator tab grommets to compress the ejector-spring. The pull-up cords are thereafter looped through the packing tray and fixed to the curved pins on the underside of the ripcord assembly. Once the ripcord assembly is pulled with sufficient force, the curved pins are extracted, and the pull-up cords are released—allowing the ejector-spring to release from the reserve parachute. The amount of force required to pull out the ripcord assembly and allow ejector-spring decompression varies by reserve parachute. AUS Army T-11 reserve parachute requires just over fourteen pounds of force to activate the ejector-spring and release the reserve parachute's internal components.

The ADD utilizes an electromagnet in conjunction with a permanent magnet to compress the ejector-spring in predetermined reserve-stop conditions, given that the ripcord assembly is manually pulled with the requisite force for activation. The ADD uses sound to alert the jumper and supporting personnel that the reserve parachute was pulled with sufficient force to otherwise allow for parachute activation. The ADD must be reconfigured, repackaged, and reset to an idle state, prior to reuse.

The jumper and supporting personnel are then advised to abort their jumps if in a pre jump condition. If in a towed jumper condition, the supporting personnel will make every effort to reign in the towed jumper, which if successful, will lead to the grounding of the previously towed jumper, and to a change of equipment. If supporting personnel are unable to reign in the towed jumper, they will cut the static line towing said jumper. If the electromagnet was previously activated, the electromagnet will then automatically deactivate, releasing the ejector-spring. The reserve parachute therefore activates; the ADD here acts as an improvised AAD. It is critical that the ADD automatically releases the reserve parachute, as the free-falling formerly towed jumper may be unconscious due to wounds suffered because of being towed. The towed jumper condition demonstrates how an ADD may be utilized as an AAD if certain requirements are met. A jumper who has fallen through a fellow jumper's parachute canopy has already exited the aircraft. That jumper will have their ejector-spring compressed by the ADD until, at the earliest, landing has occurred. The ADD must be able to distinguish between the reserve-stop conditions to function properly.

Voronka describes how various jump phases may be positively identified using inertial and pressure data. A pre-jump condition may be established by determining that an aircraft exit has not yet occurred. An aircraft exit can be identified by filtering for drastic changes in barometric pressure. A towed jumper condition may be established by filtering for significant variance in both acceleration and barometric pressure. Should barometric pressure variance decrease abruptly thereafter, the towed jumper has either been reeled into the aircraft, or the static line has been cut. A towed-jumper that has returned to the aircraft will exhibit minimal change in barometric pressure, whereas a towed-jumper whose static line has been cut will exhibit significant decreases in barometric pressure due to free-fall.

The ADD may be modified to improve jumpers' control over reserve-parachute activation. The ADD directly connects to the ripcord assembly using a draw-wire displacement sensor. The first pull with sufficient force to activate the reserve parachute will result in the electromagnet being activated, should a reserve-stop condition be met. A second pull on the ripcord assembly thereafter can trigger the deactivation of the electromagnet, effectively releasing the reserve parachute despite the positive identification of a reserve-stop condition. The ADD then acts as a secondary check on the safe activation of the reserve parachute without inhibiting jumpers' ultimate ability to activate the reserve parachute should complications arise.

Turning to the drawings, as shown in FIG. 1, the ADD 100 is comprised of a permanent magnet device 118 and an electromagnetic device 102. The permanent magnet device 118 includes a permanent magnet 117. The electromagnetic device 102 may contain a microcontroller 112, draw-wire displacement sensor 110, pressure altitude sensor 109, reset push button 111, 3-axis accelerometer 107, 3-axis gyroscope 108, power supply 113, data collection system 116, amplifier and speaker 115, and an electromagnet 114.

The microcontroller 112 includes a sufficiently powerful processor, the requisite general-purpose input/output infrastructure, and adequate amounts of read access and flash memory. The microcontroller 112 analyzes data gathered from the draw-wire displacement sensor 110, pressure altitude sensor 109, reset push button 111, 3-axis accelerometer 107, and 3-axis gyroscope 108. The microcontroller 112 then actuates the data collection system 116, amplifier and speaker 115, and an electromagnet 114 in accordance with programmed firmware.

The draw-wire displacement sensor 110 is a transducer that measures linear movement using a flexible steel wire. The steel wire extends from the electromagnetic device 114 to the underside of the ripcord assembly 101 where it is attached. Should a jumper pull the ripcord assembly 101 with sufficient force, the ripcord assembly 101 will detach from the reserve parachute pack tray, and the connected steel wire will extend in length. The displacement data is then transmitted to the microcontroller 112. Displacement above a predetermined threshold signifies reserve parachute activation. The displacement threshold factors in the length of wire required to connect the electromagnetic device 114 and the ripcord assembly 101 in a packed, nonactive reserve parachute.

The pressure altitude sensor 109 measures barometric pressure, which can be used to calculate mean sea level (MSL) altitude. MSL altitude serves as an altitude reference point. The above ground level (AGL) altitude may be determined by obtaining the MSL altitude at takeoff, and subtracting from the current MSL altitude reading. Static line military jumps are generally preformed from a non-pressurized aircraft. This suggests that the pressure altitude sensor 109 is a capable altimeter throughout the jump, from takeoff, to aircraft exit, to parachute landing fall. A Global Positioning System (GPS) module may be included to supplement the barometric pressure-based altitude calculations.

Pushing the reset push button 111 returns the ADD to an idling state. The reserve parachute pack tray must be opened for access to the reset push button 111. The reset push button 111 will self-actuate (pop) prior to the ADD entering either of two terminal states, activation, and deactivation. Entry into a terminal state requires the ADD be reconfigured and the reserve parachute be repacked. The reset push button will not self-actuate without being triggered by a pull on the reserve ripcord handle.

The ADD may contain inertial sensors such as accelerometers 107 and gyroscopes 108 on multiple axes. These inertial sensors may be packaged on a single inertial measurement unit (IMU). The IMU detects the jumper's linear and angular motion, and orientation. Inertial data transmitted to the microcontroller 112 is analyzed to determine whether the jumper is in free-fall, or, separately, in a towed state.

Activation of the electromagnet 114 produces a magnetic field that interacts with the permanent magnet 117 to provide sufficient force to compress the ejector-spring 103. Compressive strength can be adjusted through magnet selection. The electromagnet 114 is selectively activated by the microcontroller 112. All powered sensors and actuators are onboard the electromagnet device 102, allowing for a single, centralized power-supply 113. The 3-axis accelerometer 107, 3-axis gyroscope 108, and pressure altitude sensor 109 feed raw data to the microcontroller 112 which processes it to determine if a (and which) reserve-stop condition is met. The amplified speaker 115 sounds an alarm if the ADD 100 prevents the deployment of the reserve parachute 502 despite the ripcord assembly 101 being pulled. This alerts the jumper and supporting personnel to the current state of the ADD 100 and reserve parachute 502. A data collection system 116 may be included for research and liability purposes.

Figure 4:
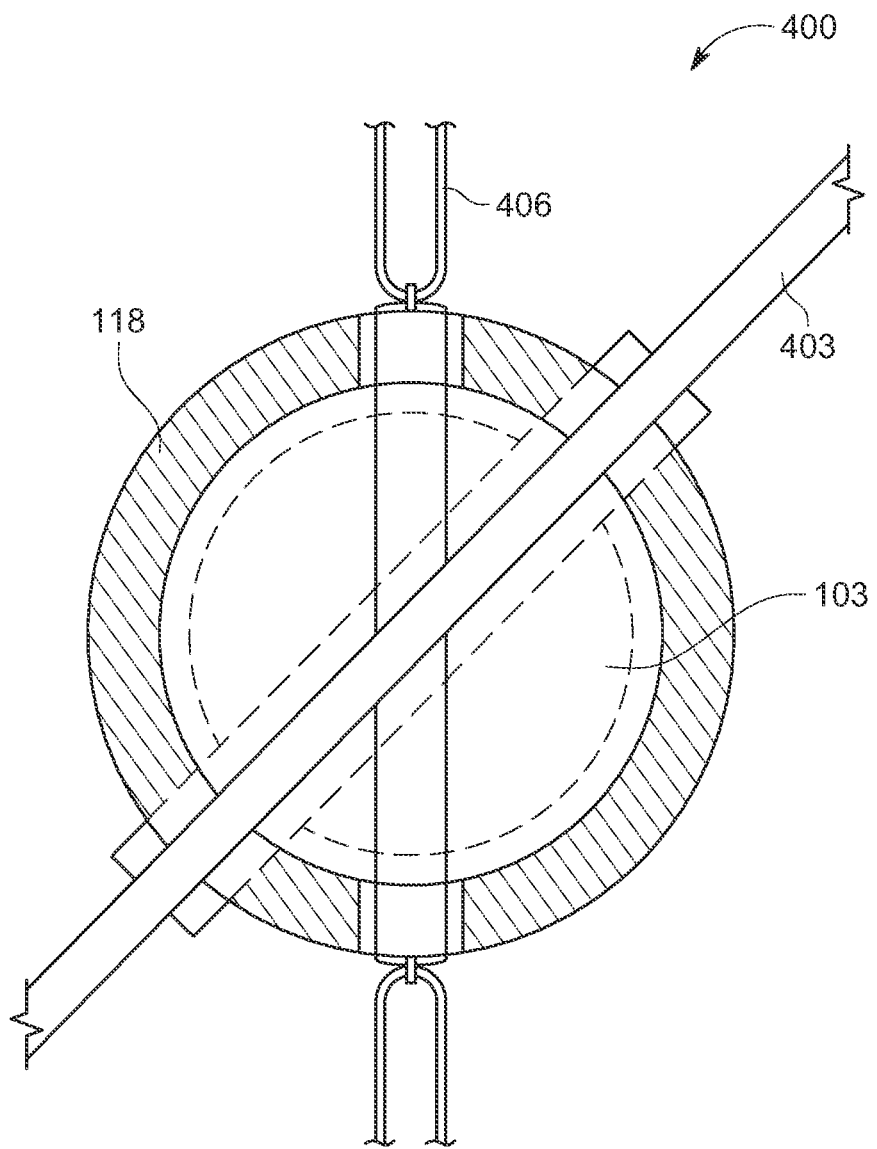
FIG. 4 shows an embodiment of an ADD permanent magnet device enclosing the compressed ejector-spring and associated packing components.
Figure 5:
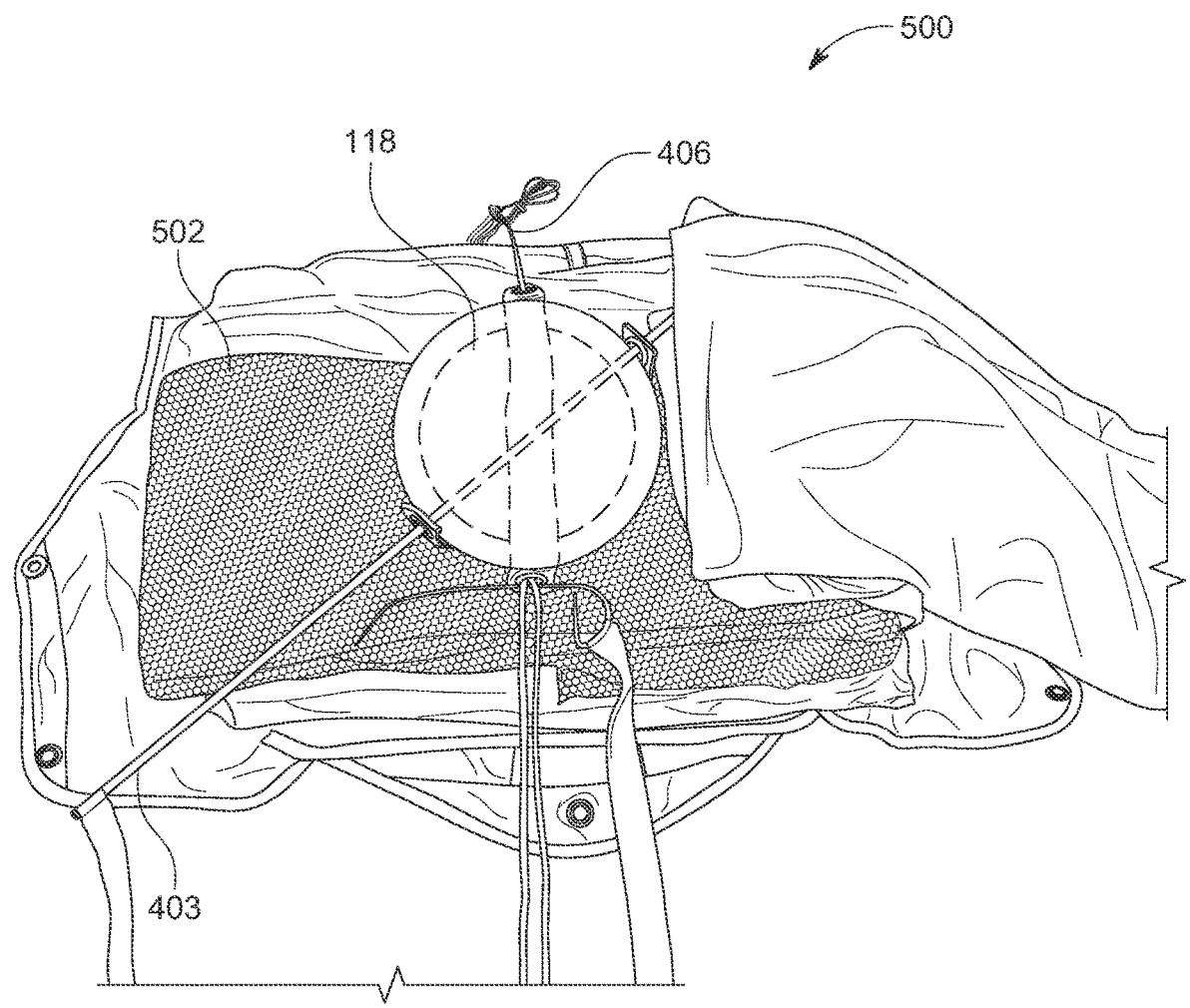
FIG. 5 shows an embodiment of an ADD packed into a reserve parachute pack tray.

As illustrated in FIG. 4 and FIG. 5, an ADD 100 may be packed into the larger reserve parachute pack assembly 500 by placing the compressed ejector-spring 103 between the magnetic device 118 and electromagnetic device 102. The collective assembly is then placed between the folds of the reserve parachute mesh panel 502. The magnetic device 118 is designed with adequate clearance to allow the packing rod 403 and pull-up cords 406 to remain unperturbed. The magnetic device 118 is always in physical contact with the electromagnet device 102; direct physical contact between the magnetically coupled devices is critical to keeping an unbound ejector-spring compressed. The reset push button 111 is recessed into the electromagnetic device 102 to reduce risk of accidental actuation.

FIG. 6. describes an ADD embodiment with four states: idle, armed, activated, and deactivated. An idle ADD is located below the armed altitude floor. This implies the ADD is at or near ground level, and therefore the electromagnet should not be activated. An idling ADD is kept in a low power limited functionality mode to reduce drain on the onboard battery. The ADD is armed once the idle altitude ceiling is reached. An armed ADD is constantly evaluating if (and which) reserve-stop condition is met. An ADD must act immediately once the ripcord assembly is sufficiently pulled, to prevent the negative consequences involved with reserve parachute activation during reserve stop conditions. If the draw-wire displacement sensor is triggered while the ADD is armed, the ADD either activates or deactivates its electromagnet, depending on whether a reserve-stop condition was last determined to have been met. An ADD may be configured to act as an AAD by deactivating its activated electromagnet while in free-fall, following a towed jumper condition. The reset push button, accessible only on ground, may be pressed to return an activated or deactivated ADD to idle. An armed ADD returns to idle if taken below the armed altitude floor. The armed altitude floor and idle altitude ceiling is presumed to be the same, but may be set to different altitudes as required.

Additional design features may be included to support the durability and functionality of the ADD. The durability of the magnetic and electromagnetic devices may be improved by securing both to the reserve parachute pack tray, otherwise releasing the reserve parachute may cause the devices to fall to the ground, potentially from heights exceeding 2,000 feet above ground level. Added design specifications may be required to ensure electromagnetic interference (EMI) induced by the ADD electromagnet and magnetic coupling does not interfere with normal device operations.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An apparatus for preventing the hazardous deployment of an ejector-spring static line reserve parachute, comprising:
    a plurality of accelerometers, each providing an output with respect to a different axis; and
    one or more pressure sensors; and
    a processor for estimating jumper velocity and altitude as a function of the outputs of the accelerometers and one or more pressure sensors; and
    one or more transducers for determining if and the extent to which the reserve ripcord assembly is manually pulled; and
    an electromagnetic mechanism for preventing the deployment of an ejector-spring based reserve parachute if the reserve ripcord assembly has been manually pulled and if changes in velocity and altitude indicate hazardous environmental conditions.

2. The apparatus of claim 1, further including a plurality of gyroscopes, each providing an output with respect to a different axis; and
    wherein the processor is further operative to determine orientation as a function of the outputs of the gyroscopes.

3. The apparatus of claim 1, further including one or more sound producing devices for indicating activation of the electromagnet.

4. The apparatus of claim 1, further including one or more data collection systems for documenting the trajectory and orientation of the jumper.

5. The electromagnetic mechanism of claim 1, comprising:
    a permanent magnet; and
    an electromagnet,
wherein the permanent magnet and electromagnet form an attracting magnetic couple aligned on a first axis, separated by the compressed ejector-spring.

6. A method of preventing the hazardous activation of an ejector-spring based reserve parachute, comprising the steps of:
    determining the altitude of the reserve parachute; and
    determining whether the reserve ripcord assembly is manually pulled; and
    determining whether a jumper attached to the reserve parachute is experiencing a hazardous environmental condition; and
    activating a mechanism to compress the ejector-spring and prevent activation of the reserve parachute, if deemed appropriate; and
    deactivating the mechanism to decompress the ejector-spring and allow activation of the reserve parachute, if deemed appropriate.

7. The method of claim 6 wherein determining the altitude of the reserve parachute is accomplished by using one or more pressure sensors.

8. The method of claim 6 wherein the determining whether the reserve ripcord assembly is manually pulled is accomplished by using one or more transducers.

9. The method of claim 6 wherein determining whether a jumper attached to the reserve parachute is experiencing a hazardous environmental condition is accomplished by using the outputs of one or more accelerometers and one or more pressure sensors.

10. The method of claim 6 wherein activating a mechanism to compress the ejector-spring and prevent activation the reserve parachute, if deemed appropriate, is accomplished by using an electromagnetic mechanism comprising a permanent magnet and an electromagnet, wherein the permanent magnet and electromagnet form an attracting magnetic couple aligned on a first axis, separated by the compressed ejector-spring.

* * * * *